No. 847,543. PATENTED MAR. 19, 1907.
E. BATAULT.
THERMALLY OPERATED APPARATUS.
APPLICATION FILED MAY 14, 1902.

3 SHEETS—SHEET 1.

Witnesses:
Jas. F. Coleman
Jno. Robt Taylor

Inventor
Emile Batault
By Dyer Edmonds & Dyer
Att'ys.

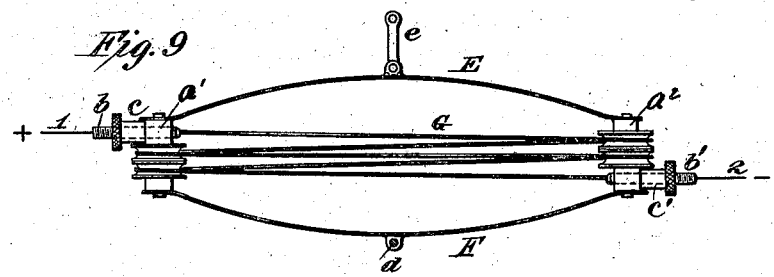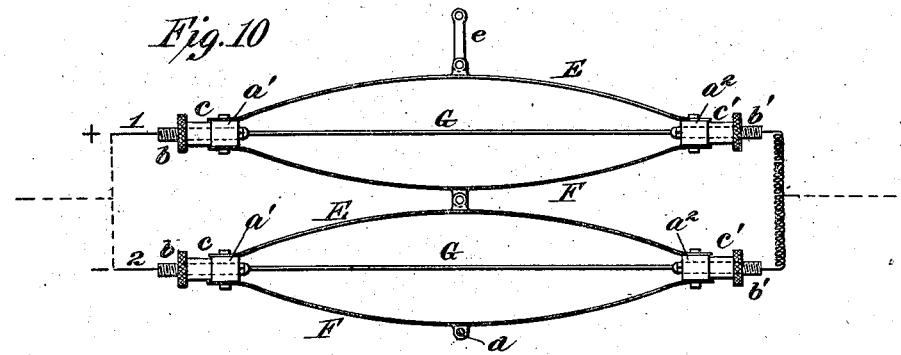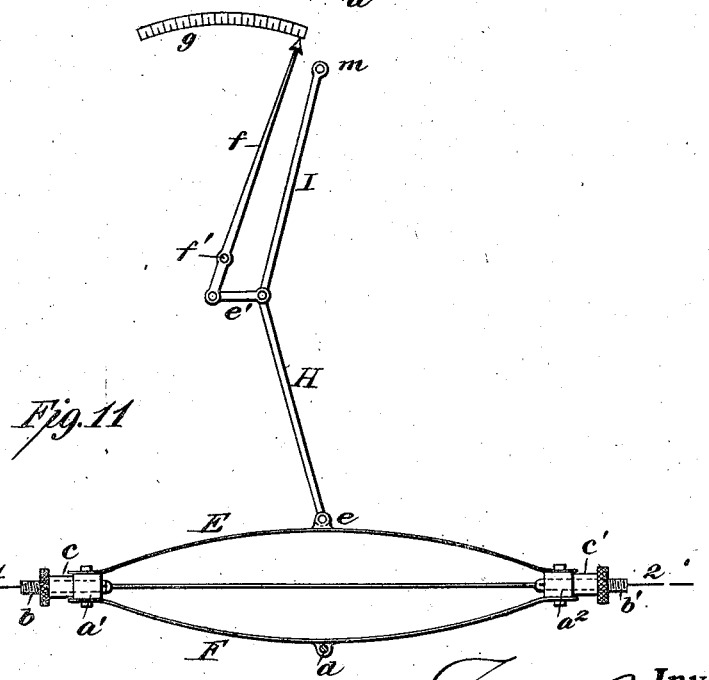

No. 847,543. PATENTED MAR. 19, 1907.
E. BATAULT.
THERMALLY OPERATED APPARATUS.
APPLICATION FILED MAY 14, 1902.
3 SHEETS—SHEET 3.
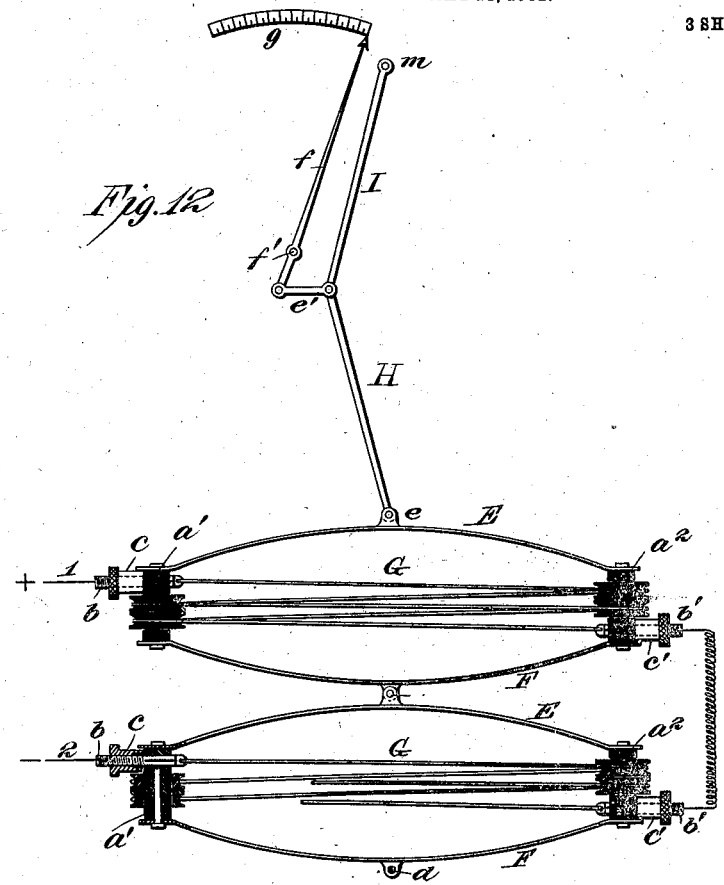
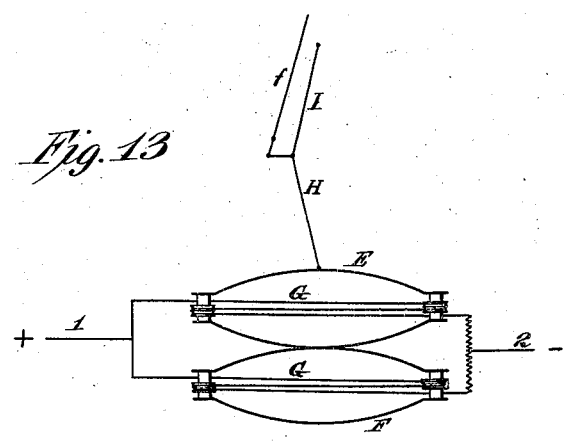
Witnesses: Inventor
Jas. F. Coleman Emile Batault,
Jno. Robt Taylor By Dyer & Dyer
Attorneys

UNITED STATES PATENT OFFICE.

EMILE BATAULT, OF GENEVA, SWITZERLAND.

THERMALLY-OPERATED APPARATUS.

No. 847,543.   Specification of Letters Patent.   Patented March 19, 1907.

Application filed May 14, 1902. Serial No. 107,236.

*To all whom it may concern:*

Be it known that I, EMILE BATAULT, a citizen of the Republic of Switzerland, residing at Geneva, in the canton of Geneva, Switzerland, have invented a certain new and useful Improvement in Thermally-Operated Apparatus, of which the following is a description.

The object I have in view is to produce a primary operating device for thermally-operated apparatus which shall be simple in construction and effective in operation and whereby changes in the form of a body due to temperature variations can be amplified and mechanically translated.

In carrying out the invention I employ a wire or metallic blade stretched between the extremities of a bow, the wire forming the chord of an arc. The length of the chord being varied by variations in its temperature produced by variations in the temperature of the atmosphere in which the chord is immersed or by variations in the strength of an electric current passed through the chord, the height of the arc will be varied, and this latter variation I employ as a means for moving devices for indicating the temperature or the power of the medium producing it—such, for instance, as the electric current—or for moving or controlling any apparatus which it may be desired to move or control by a primary device of this character.

Figure 4:
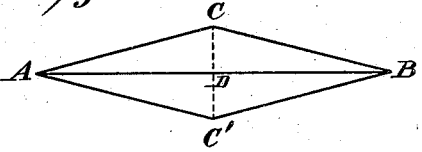
Figures 5, 6:
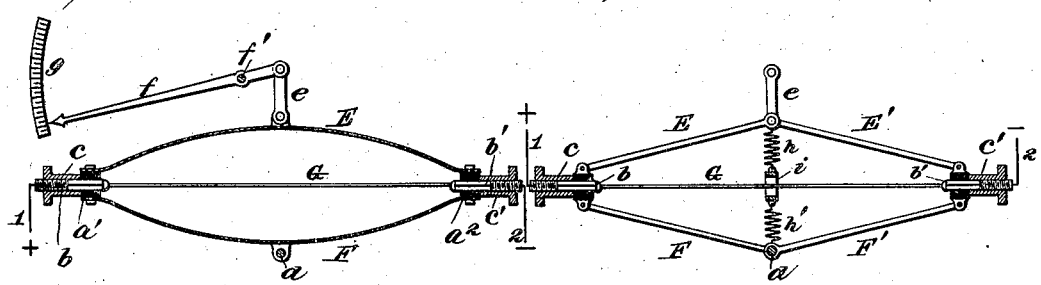
Figure 7:
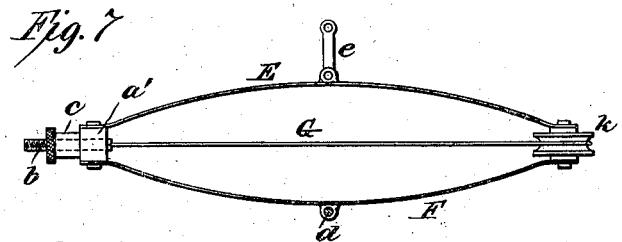

In the accompanying drawing, Figures 1, 2, 3, and 4 are diagrams illustrating the principle of the invention. Figs. 5 and 6 are top views of simple forms of the apparatus embodying the principles illustrated by the diagrams. Fig. 7 is a top view, and Fig. 8 a side view, of a modified form of the apparatus. Figs. 9, 10, 11, 12, and 13 are top views of other modifications.

Figure 1:
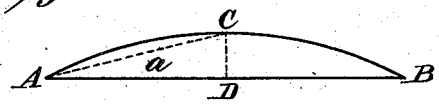
Figure 3:
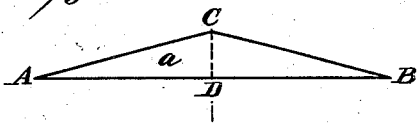

In Fig. 1, A D B represents the chord, and A C B an arc of any suitable elastic material having a tendency to stretch the chord A D B, the height of the arc being represented by C D. It will be seen that any increase in the length of the chord A D B will produce a decrease in the height of the arc, and vice versa, and it will also be seen that variations in the length of the chord A D B bear the same relation to variations in the height C D of the arc as variations in the cosine bear to variations in the sine of the angle $a$. If this angle $a$ is comparatively small, any change in the length of the chord A D B, however minute it is, will produce a relatively great change in the height of the arc. and if these changes in the height of the arc are translated by an appropriate mechanism to a hand running over a scale or to other suitable devices any caloric influence to which the chord A D B is subjected can be indicated or can be employed to move or control other apparatus. To utilize the movement produced by variations in the height C D of the arc, the apparatus should be given a fixed position either at C or D, while the connection with the device to be operated by the apparatus should be made at the other of these two points. Preferably the bow A C B will be made of a metal or material the dimensions of which vary but slightly with the temperature, and the wire or blade A D B will be made of a material or metal which has a greater coefficient of dilatation. This is particularly true where the device is operated by variations in temperature of the surrounding atmosphere to which the bow, as well as the chord, is subjected; but if the chord alone is subjected to variations in temperature, as it will be when heated by an electric current, the difference in the coefficient of dilatation of the materials of the chord and bow is not so important nor even necessary. Different kinds of apparatus can be constructed on this principle—such, for instance, as thermometers, thermostats, or electric indicating or measuring instruments. My device may also take the place of electromagnets in a great many instruments where a too rapid action is not desirable. It has over an ordinary solenoid or magnet the great advantage of being equally operative with alternating and continuous currents. It is also cheaper and is completely aperiodic in its action.

Figure 2:
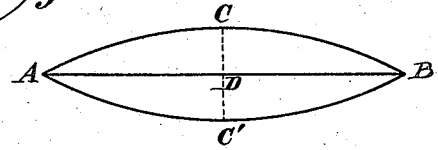

In order to further multiply the movement produced by variations in the length of the chord A D B, this chord may connect two similar arcs A C B and A C' B, forming together a lozenge-shaped body, as illustrated in Fig. 2, the apparatus being fixed at either the point C or the point C' and the other of these two points being connected with the devices to be moved by the apparatus. The bow of my device instead of being curved may have an angular form A C B, Fig. 3, forming with the chord A D B a triangle, the parts being preferably articulated together and provided with a spring or springs under tension tending to stretch the chord, and this form of device may be made double, as illustrated in Fig. 4.

In Fig. 5, which shows a simple apparatus embodying the form illustrated in the diagrams 1 and 2, E F are the two spring-bows, connected at their ends with separating-blocks $a'$ $a^2$, through which pass pins $b$ $b'$, to which the wire G is secured at its ends. The pins $b$ $b'$ are square where they pass through the blocks $a'$ $a^2$ and outside of these blocks are made round and are screw-threaded to receive nuts $c$ $c'$, by means of which the tension upon the wire G can be adjusted. When the apparatus is used for electrical purposes, the pins $b$ $b'$ are connected in the electric circuit by means of wires 1 2 and the blocks $a'$ $a^2$ are made of insulating material. The bow F is secured at its center to a stationary stud $d$, while the center of the bow E is pivoted to a link $e$, connected with the device to be operated, as to a pointer $f$, moving over a scale $g$, the pointer being held by a fixed pivot $f'$.

In Fig. 6 is illustrated a simple embodiment of the form of apparatus shown by the diagrams 3 and 4. The wire G is secured to pins $b$ $b'$, passing through blocks $a'$ $a^2$ and adjusted by nuts $c$ $c'$, as in Fig. 5. The two bows are formed by means of links E E' and F F', which are pivoted to the blocks $a'$ $a^2$ and are articulated together to give the triangular form illustrated in the diagrams 3 and 4. The two bows are connected together by springs $h$ $h'$, connected with a ring $i$, through which the wire G passes. These springs $h$ $h'$ tend to draw the bows together and stretch the wire G. The bow F F' is pivoted at its center upon a stationary stud $d$, while the bow E E' has at its center the connection $e$ for moving the devices to be operated.

Figure 8:
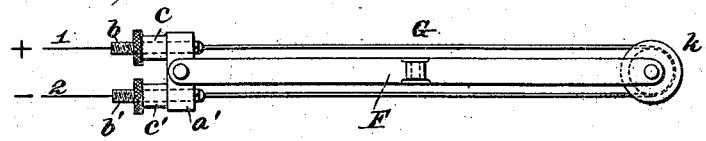

The wire G instead of being a single length of wire may have a double length and have its ends brought back to the same end of the apparatus, as illustrated in Figs. 7 and 8. In this construction the two bows are separated at one end by a grooved block, which is preferably a pulley $k$, and at the other end they are separated by a long cross-block $a'$, which receives both of the studs $b$ $b'$. The wire G extends from one of these studs around the pulley $k$ and back to the other stud.

As another modification a number of lengths of wire can be employed, as illustrated in Fig. 9. In this case the blocks $a'$ $a^2$, which separate the bows at their ends, are given a sufficient length to accommodate a number of turns of wire, the ends of the wire being connected with adjustable studs $b$ $b'$ at the same or at opposite ends of the apparatus.

In order to still further multiply the movement produced by variations in the length of the chord, two or more of the double-bow devices of any of the constructions before described may be joined together in succession at the centers of the bows, as illustrated in Fig. 10, the outside bow of the entire apparatus being connected with a stationary stud $d$ and the other outside bow having the movable connection $e$ for connecting the apparatus with the devices to be moved thereby. Where the apparatus is to be used in an electric circuit, the wires G of the two or more bows may be connected in multiple or series in the electric circuit. A series arrangement is shown in Fig. 10 in full lines, while a multiple-arc arrangement of the connections is shown in dotted lines in that figure. By arranging a number of these double bows in succession the variations in the height of all the arcs will be added together and will produce between the fixed point $d$ and the movable connection $e$ a resulting motion as many times greater than the movement of a single arc as there are arcs coupled together. In this way the most minute change in the length of the chords will produce an appreciable change in the distance between the points $d$ $e$.

I may obtain a still greater amplification of movement by the construction shown in Fig. 11, wherein the primary operating device, consisting of one or of any number of bows, is connected at its movable point $e$ with one end of a bow H I, arranged perpendicularly to the bows of the primary operating device. The bow H I is fixed at its other end $m$ and is connected at its center by a link $e'$ with the device to be moved. By this arrangement the changes in the distance between $d$ and $e$ are amplified at $e'$ by reason of the principle already explained, $e$ $m$ being in this case a virtual chord, the length of which depends upon the approach and recession of the points $d$ $e$.

It is obvious that the additional amplifying device of Fig. 11 could be used with any of the forms of primary-operating device shown in the other figures of the drawing. This is illustrated in Figs. 12 and 13, the former showing the device with series connections and the latter with connections in multiple. In the device illustrated in Fig. 12 current enters at 1, passes through the wire connected in the upper device, and from that to the lower device, passing out at 2. In Fig. 13 the current enters at 1, divides between the two devices, and passes out at 2.

What I claim is—

1. The combination with a resilient arc or bow, of a chord of electric conducting material connecting the ends of said arc or bow and holding it under tension so that said chord must always be straight, insulation separating the chord electrically from the bow, circuit connections with said chord for changing its temperature by variations in the flow of an electric current therethrough, whereby the variations in the length of the chord will result in an amplified movement producing variations in the height of the arc or bow, a moving device operated by the variations in the height of the bow or arc and means for transmitting such amplified movement to the device to be operated thereby, substantially as set forth.

2. The combination with two resilient arcs or bows secured together at their ends, of a chord of electric conducting material connecting the ends of both arcs or bows and holding them under tension so that said chord must always be straight, insulation separating the chord electrically from the bows, circuit connections with said chord for changing its temperature by variations in the flow of an electric current therethrough, whereby the variations in the length of the chord will result in an amplified movement producing variations in the height of the arcs or bows, a moving device operated by the variations in height of the bows or arcs and means for transmitting such amplified movement to the device to be operated thereby, substantially as set forth.

3. The combination of a plurality of resilient double arcs or bows, a chord of electric conducting material connecting the ends of each of said double arcs or bows and holding them under tension so that said chord must always be straight, insulation separating the chords electrically from the bows, circuit connections with said chords for changing their temperature by variations in the flow of an electric current therethrough, such double arcs or bows being connected together at the centers of the arcs or bows and producing an amplified movement which is resultant of the variations in height of all the arcs or bows, a moving device operated by the variations in height of the bows or arcs and means for transmitting such amplified movement to the device to be operated thereby, substantially as set forth.

4. A thermally-operated apparatus having in combination a resilient arc or bow, and a chord connecting the ends of the arc or bow and holding it under tension, said chord passing two or more times between the ends of the arc or bow, substantially as set forth.

5. A thermally-operated apparatus having in combination a resilient arc or bow, a chord connecting the ends of the arc or bow and holding it under tension, said chord passing two or more times between the ends of the arc or bow, and a roller at the bight of the chord to permit relative movement of, and equalize the strain upon, the lengths of the chord, substantially as set forth.

6. A thermally-operated apparatus having in combination a resilient arc or bow, a chord connecting the ends of the arc or bow and holding it under tension, said chord passing several times back and forth between the ends of the arc or bow, and independent sheaves at each end of the bow for receiving the bight of the chord so as to permit relative movement of, and equalize the strain upon, the several lengths of the chord, substantially as set forth.

7. A thermally-operated apparatus having in combination a resilient arc or bow, a chord of non-resilient material connecting the ends of the arc or bow and holding it under tension so that said chord must always be straight, an arc or bow perpendicular to the first arc or bow and connected to the center thereof, whereby variations in the length of the chord connecting the first arc or bow will produce variations in the height of the arc or bow, which will in turn produce variations in the height of the second arc or bow, and means connected with the center of the second arc or bow for transmitting the amplified movement to a device to be operated thereby, substantially as set forth.

8. A thermally-operated apparatus having in combination a resilient arc or bow, a chord of electric conducting material connecting the ends of the arc or bow and holding it under tension, said chord passing two or more times between the ends of the arc or bow, and a roller in the bight of the chord to permit relative movement of, and equalize the strain upon, the several lengths of the chord, substantially as set forth.

9. In a thermally-operated apparatus having in combination a resilient arc or bow, a chord of electric conducting material connecting the ends of the bow and holding it under tension, said chord passing several times back and forth between the ends of the arc or bow, independent sheaves at each end of the bow for receiving the bight of the chord so as to permit relative movement of, and equalize the strain upon, the several lengths of the chord, and circuit connections with said chord for changing its temperature by variations in the flow of an electric current therethrough, whereby the variations in the length of the chord will result in an amplified movement producing variations in the height of the arc or bow, substantially as set forth.

10. In a thermally-operated apparatus having in combination a pair of resilient arcs or bows, a chord of electric conducting material connecting the ends of the bows and holding them under tension, said chord passing several times back and forth between the ends of the arcs or bows, independent sheaves at each end of the bows for receiving the bight of the chord so as to permit relative movement of, and equalize the strain upon, the several lengths of the chord, and circuit connections with said chord for changing its temperature by variations in the flow of an electric current therethrough, whereby the variations in the length of the chord will result in an amplified movement producing variations in the height of the arcs or bows, substantially as set forth.

11. In a thermally-operated apparatus having in combination a pair of resilient arcs or bows, a chord of electric conducting material connecting the ends of the bows and holding them under tension, said chord passing several times back and forth between the ends of the arcs or bows, independent sheaves at each end of the bows for receiving the bight of the chord so as to permit relative movement of, and equalize the strain upon, the several lengths of the chord, circuit connections with said chord for changing its temperature by variations in the flow of an electric current therethrough, whereby the variations in the length of the chord will result in an amplified movement producing variations in the height of the arcs or bows, and electrical connections between said arcs or bows, substantially as set forth.

12. In a thermally-operated apparatus having in combination a pair of resilient arcs or bows, a chord of electric conducting material connecting the ends of the bows and holding them under tension, said chord passing several times back and forth between the ends of the arcs or bows, independent sheaves at each end of the bows for receiving the bight of the chord so as to permit relative movement of, and equalize the strain upon, the several lengths of the chord, circuit connections with said chord for changing its temperature by variations in the flow of an electric current therethrough, whereby the variations in the length of the chord will result in an amplified movement producing variations in the height of the arcs or bows, and series electrical connections between said arcs or bows, substantially as set forth.

13. In a thermally-operated apparatus having in combination a resilient arc or bow, a chord of electric conducting material connecting the ends of the bow and holding it under tension, said chord passing several times back and forth between the ends of the arc or bow, independent sheaves at each end of the bow for receiving the bight of the chord so as to permit relative movement of, and equalize the strain upon, the several lengths of the chord, circuit connections with said chord for changing its temperature by variations in the flow of an electric current therethrough, whereby the variations in the length of the chord will result in an amplified movement producing variations in the height of the arc or bow, and means for transmitting such amplified movement to a device to be operated thereby, substantially as set forth.

14. The combination with two resilient arcs or bows secured together at their ends, of a chord of electric conducting material connecting the ends of both arcs or bows, and holding them under tension so that said chord must always be straight, insulation separating the chord electrically from the bows, said chord passing two or more times back and forth between the ends of the arcs or bows, circuit connections with said chord for changing its temperature by variation in the flow of electric current therethrough, whereby the variations in the length of the rochd will result in an amplified movement producing variations in the height of the arcs or bows, and means for transmitting such amplified movement to a device to be operated thereby, substantially as set forth.

This specification signed and witnessed this 2d day of May, 1902.

EMILE BATAULT.

Witnesses:
L. H. MUNIER,
FELECIE VILLIE SERMET.